United States Patent
Olander et al.

(10) Patent No.: US 10,883,052 B2
(45) Date of Patent: *Jan. 5, 2021

(54) BIOCHAR KILN

(71) Applicant: BIOCHAR NOW, LLC, Loveland, CO (US)

(72) Inventors: Mikel Olander, Johnstown, CO (US); Perry Pierce, II, Fort Collins, CO (US); William T. Beierwaltes, Loveland, CO (US); James G. Gaspard, II, Loveland, CO (US)

(73) Assignee: BIOCHAR NOW, LLC, Loveland, CO (US)

(*) Notice: Subject to any disclaimer, the term of this patent is extended or adjusted under 35 U.S.C. 154(b) by 27 days.

This patent is subject to a terminal disclaimer.

(21) Appl. No.: 16/503,875

(22) Filed: Jul. 5, 2019

(65) Prior Publication Data

US 2019/0330533 A1    Oct. 31, 2019

Related U.S. Application Data

(63) Continuation of application No. 15/453,502, filed on Mar. 8, 2017, now Pat. No. 10,385,273.

(Continued)

(51) Int. Cl.
*C10B 53/02* (2006.01)
*F23L 1/02* (2006.01)
(Continued)

(52) U.S. Cl.
CPC ............. *C10B 53/02* (2013.01); *C10B 1/02* (2013.01); *F23G 5/027* (2013.01); *F23G 5/0276* (2013.01);
(Continued)

(58) Field of Classification Search
CPC .. C10B 53/02; C10B 1/02; C10B 1/04; C10B 1/10; F23G 7/10; F23G 7/105; F23G 2209/26; F23G 2209/261; F23G 2209/262
See application file for complete search history.

(56) References Cited

U.S. PATENT DOCUMENTS

| | | |
|---|---|---|
| 414,938 A | 11/1889 | Burcey |
| 2,571,550 A | 10/1951 | Ehmann |

(Continued)

FOREIGN PATENT DOCUMENTS

| | | |
|---|---|---|
| JP | 02052919 | 2/1990 |
| JP | 4267968 | 5/2009 |

(Continued)

OTHER PUBLICATIONS

Simmons, "Charcoal from portable kilns and fixed installations", 1963, 19 pages, Unasylva—No. 71, vol. 17, Food and Agriculture Organization of the United Nation.

(Continued)

*Primary Examiner* — David J Laux
(74) *Attorney, Agent, or Firm* — Trenner Law Firm, LLC; Mark D. Trenner

(57) ABSTRACT

A biochar kiln is disclosed. An example of the biochar kiln includes a kiln body having a sidewall, a floor attached to the sidewall, and a removable lid. The example biochar kiln also includes a plurality of semi-independent combustion cells. The example biochar kiln also includes an outside vent pipe loading to a center of the semi-independent combustion cells to provide combustion air.

17 Claims, 14 Drawing Sheets

Related U.S. Application Data

(60) Provisional application No. 62/317,573, filed on Apr. 3, 2016.

(51) Int. Cl.

| | | |
|---|---|---|
| *F23G 7/10* | (2006.01) | |
| *F23G 5/027* | (2006.01) | |
| *C10B 1/02* | (2006.01) | |
| *F23G 5/40* | (2006.01) | |

(52) U.S. Cl.
CPC ............... *F23G 5/40* (2013.01); *F23G 7/10* (2013.01); *F23L 1/02* (2013.01); *F23G 2209/26* (2013.01); *Y02E 50/10* (2013.01)

(56) References Cited

U.S. PATENT DOCUMENTS

| | | | |
|---|---|---|---|
| RE23,694 E | 8/1953 | Ehmann | |
| 2,739,009 A | 3/1956 | Phillips | |
| 2,819,113 A | 1/1958 | Phillips | |
| 2,847,369 A | 8/1958 | Hughes | |
| 3,438,523 A | 4/1969 | Vik | |
| 3,500,812 A | 3/1970 | Korngold | |
| 3,512,670 A | 5/1970 | Howard | |
| 3,595,181 A | 7/1971 | Anderson | |
| 3,695,192 A | 10/1972 | Von Brimer | |
| 3,777,676 A | 12/1973 | Lagers | |
| 4,117,826 A | 10/1978 | Bette | |
| 4,167,909 A | 9/1979 | Dauvergne | |
| 4,249,883 A | 2/1981 | Woolfolk | |
| 4,256,081 A | 3/1981 | Stover | |
| 4,261,269 A | 4/1981 | Mallek et al. | |
| 4,263,890 A | 4/1981 | Turko et al. | |
| 4,276,871 A | 7/1981 | Lindveit | |
| 4,419,942 A | 12/1983 | Johnson | |
| 4,454,826 A * | 6/1984 | Benedick | F28D 17/005 110/211 |
| 4,765,256 A | 8/1988 | Caughey | |
| 4,810,385 A | 3/1989 | Hater et al. | |
| 5,014,680 A | 5/1991 | Siemer | |
| 5,018,458 A | 5/1991 | McIntyre et al. | |
| 5,160,259 A | 11/1992 | O'Hara et al. | |
| 5,190,901 A | 3/1993 | Hirai | |
| 5,236,298 A | 8/1993 | Lehman | |
| 5,281,076 A | 1/1994 | Lehman | |
| 5,305,954 A | 4/1994 | Abel | |
| 5,499,622 A | 3/1996 | Woods | |
| 5,770,079 A | 6/1998 | Haase | |
| 5,799,590 A | 9/1998 | Noguchi | |
| 5,968,320 A | 10/1999 | Sprague | |
| 6,484,714 B1 | 11/2002 | Smith | |
| 6,655,304 B1 * | 12/2003 | Barlow | F23G 5/002 110/347 |
| 6,790,317 B2 | 9/2004 | Antal, Jr. | |
| 7,241,322 B2 * | 7/2007 | Graham | C10J 3/34 48/111 |
| 7,354,557 B2 | 4/2008 | Muramatsu | |
| 7,371,308 B1 | 5/2008 | Hackl | |
| 7,381,333 B1 | 6/2008 | Rainer | |
| 7,399,458 B1 | 7/2008 | Martin | |
| 7,458,809 B2 | 12/2008 | Hohenshelt et al. | |
| 7,678,176 B2 | 3/2010 | Whitten et al. | |
| 8,100,990 B2 | 1/2012 | Ellens et al. | |
| 8,287,728 B2 | 10/2012 | Kania et al. | |
| 8,361,186 B1 | 1/2013 | Shearer et al. | |
| 8,419,812 B2 | 4/2013 | Ershag | |
| 8,512,644 B1 | 8/2013 | Maganas | |
| 8,673,150 B2 | 3/2014 | Pearson | |
| 8,747,797 B2 | 6/2014 | Shearer et al. | |
| 8,812,162 B2 | 8/2014 | Schneider et al. | |
| 8,986,507 B2 | 3/2015 | Schottdorf | |
| 9,139,790 B2 | 9/2015 | Taniguro et al. | |
| 9,321,966 B2 | 4/2016 | Wang | |
| 9,725,371 B2 | 8/2017 | Shearer et al. | |
| 9,752,078 B2 * | 9/2017 | Aupperle | F23L 5/02 |
| 9,878,301 B1 | 1/2018 | Kinsman et al. | |
| 9,878,924 B2 | 1/2018 | Beierwaltes et al. | |
| 9,975,792 B2 | 5/2018 | Thorgersen et al. | |
| 10,370,593 B2 * | 8/2019 | Aupperle | C10B 49/02 |
| 10,385,273 B2 * | 8/2019 | Olander | C10B 1/02 |
| 2003/0024165 A1 | 2/2003 | Antal, Jr. | |
| 2003/0034286 A1 | 2/2003 | Butler | |
| 2003/0136734 A1 | 7/2003 | Mirzayi et al. | |
| 2004/0178052 A1 | 9/2004 | Antal, Jr. | |
| 2005/0051918 A1 | 3/2005 | Muramatsu | |
| 2008/0141997 A1 | 6/2008 | Druin | |
| 2008/0223269 A1 | 9/2008 | Paoluccio | |
| 2009/0199747 A1 | 8/2009 | Laskowski et al. | |
| 2009/0211892 A1 | 8/2009 | Cunningham | |
| 2009/0215375 A1 | 8/2009 | Hagensen | |
| 2009/0269181 A1 | 10/2009 | Moffitt | |
| 2010/0031571 A1 | 2/2010 | Ershag | |
| 2010/0120128 A1 | 5/2010 | Liang | |
| 2011/0100272 A1 | 5/2011 | Hasselbring et al. | |
| 2011/0108018 A1 | 5/2011 | Heinsohn et al. | |
| 2011/0114144 A1 | 5/2011 | Green et al. | |
| 2011/0172092 A1 | 7/2011 | Lee et al. | |
| 2011/0252699 A1 | 10/2011 | Shepard | |
| 2012/0079762 A1 | 4/2012 | Schottdorf | |
| 2012/0116589 A1 | 5/2012 | Schneider et al. | |
| 2012/0193212 A1 | 8/2012 | Taniguro et al. | |
| 2012/0237994 A1 | 9/2012 | Das et al. | |
| 2012/0304718 A1 | 12/2012 | Cheiky et al. | |
| 2012/0305380 A1 | 12/2012 | Wang | |
| 2013/0068690 A1 | 3/2013 | McCord et al. | |
| 2013/0341175 A1 | 12/2013 | Linden et al. | |
| 2013/0341176 A1 | 12/2013 | Filho | |
| 2014/0151296 A1 | 6/2014 | Moore et al. | |
| 2014/0323297 A1 | 10/2014 | Harman et al. | |
| 2015/0040804 A1 | 2/2015 | Aupperle | |
| 2015/0136581 A1 | 5/2015 | Aupperle | |
| 2015/0144564 A1 | 5/2015 | Moller et al. | |
| 2015/0219341 A1 * | 8/2015 | Yun | F24C 5/04 126/39 E |
| 2015/0237813 A1 | 8/2015 | Field | |
| 2016/0075567 A1 | 3/2016 | Tour et al. | |
| 2016/0211041 A1 | 7/2016 | Maganas | |
| 2016/0229709 A1 | 8/2016 | Beierwaltes | |
| 2017/0055502 A1 | 3/2017 | Gagliano et al. | |
| 2017/0283703 A1 | 10/2017 | Olander et al. | |
| 2017/0283704 A1 | 10/2017 | Olander et al. | |
| 2017/0369785 A1 | 12/2017 | Aupperle et al. | |
| 2018/0072953 A1 | 3/2018 | Aupperle et al. | |
| 2018/0072954 A1 | 3/2018 | Aupperle et al. | |
| 2018/0105437 A1 | 4/2018 | Beierwaltes et al. | |
| 2018/0282628 A1 | 10/2018 | Aupperle et al. | |
| 2018/0282629 A1 | 10/2018 | Aupperle et al. | |
| 2018/0282630 A1 | 10/2018 | Aupperle et al. | |
| 2018/0327329 A1 | 11/2018 | Boutchev et al. | |
| 2019/0030725 A1 | 1/2019 | Olander et al. | |

FOREIGN PATENT DOCUMENTS

| | | |
|---|---|---|
| KR | 1020020010902 | 2/2002 |
| WO | WO 2006117006 | 11/2006 |
| WO | WO 2010122525 | 10/2010 |
| WO | WO 2010129996 | 11/2010 |
| WO | WO 2011097183 | 8/2011 |
| WO | WO 2011143718 | 11/2011 |
| WO | WO 2012061795 | 5/2012 |
| WO | WO 2013126477 | 8/2013 |
| WO | WO 2013152337 | 10/2013 |
| WO | WO 2014059141 | 4/2014 |
| WO | WO 2014179670 | 11/2014 |

OTHER PUBLICATIONS https://www.constructionequipment.com/company/jrb, "JRB", Accessed Oct. 31, 2019, 4 pages.

https://www.constructionequipment.com/jrb-multi-pick-coupler, "JRB Multi Pick Coupler", Sep. 28, 2010, 8 pages.

(56) References Cited

OTHER PUBLICATIONS

International Search Report and the Written Opinion for app. No. PCT/US2016/015943 dated Jun. 9, 2016, 11 pgs.
International Search Report and the Written Opinion for app. No. PCT/US2013/025999 dated Jun. 12, 2013, 8 pgs.
International Search Report and the Written Opinion for app. No. PCT/US2013/030079 dated Jun. 18, 2013, 9 pgs.
English abstract for JP No. 4267968 dated May 27, 2009, 2 pgs.
Machine Translation of KR-10-2002-0010902, obtained from Kipris, Feb. 6, 2002, 83 pp.
International Preliminary Report on Patentability for International Application No. PCT/US2013/030079, dated Aug. 19, 2014, 5 pp.
International Preliminary Report on Patentability for International Application No. PCT/US2013/025999, dated Aug. 19, 2014, 5 pp.
Sugarman, Joe, "Is it Safe to Swim in the Chesapeake Bay?", Washingtonian Magazine, Jun. 28, 2016 (downloaded Dec. 31, 2018), 21 pages, Washington, D.C.
Greenyarn—Technology in Nature, www.greenyarn.com, Copyright 2005 (downloaded Dec. 31, 2018), 5 pages, Greenyarn LLC, Boston, Massachusetts.
www.reddit.com, "Are you supposed to wear underwear under swim trunks?", blog conversation dated 2015 (downloaded Dec. 31, 2018), 8 pages.
Schmidt, Hans-Peter, "Novel Uses of Biochar—a key technology for the future of the planet," downloaded from https://scholarworks.umass.edu/biochar/2013/Benefits/7/ (downloaded Dec. 31, 2018), 106 pages.
USEPA technical report "Toxic Contaminants in the Chesapeake by and Its Watershed; Extent and Severity of Occurrence and Potential Biological Effects," Technical Report Dec. 2012, p. 44-59, Annapolis, Maryland.
Yao, Ying, et al., "Effect of biochar amendment on sorption and leaching of nitrate, ammonium, and phosphate in a sandy soil," Chemosphere, 2012, pp. 1467-1471, vol. 89, Elsevier, Gainesville, Florida.
Wang, Zhanghong, et al. Biochar produced from oak sawdust by Lanthanum (La)-involved pyrolysis for adsorption of ammonium ($NH_4+$), nitrate ($NO_3-$), and phosphate ($PO_3/4-$), Chemosphere, 2015, pp. 646-653, vol. 119, Elsevier, China.
International Preliminary Report on Patentability for International Application No. PCT/US2016/015943, dated Aug. 8, 2017, 7 pp.

* cited by examiner

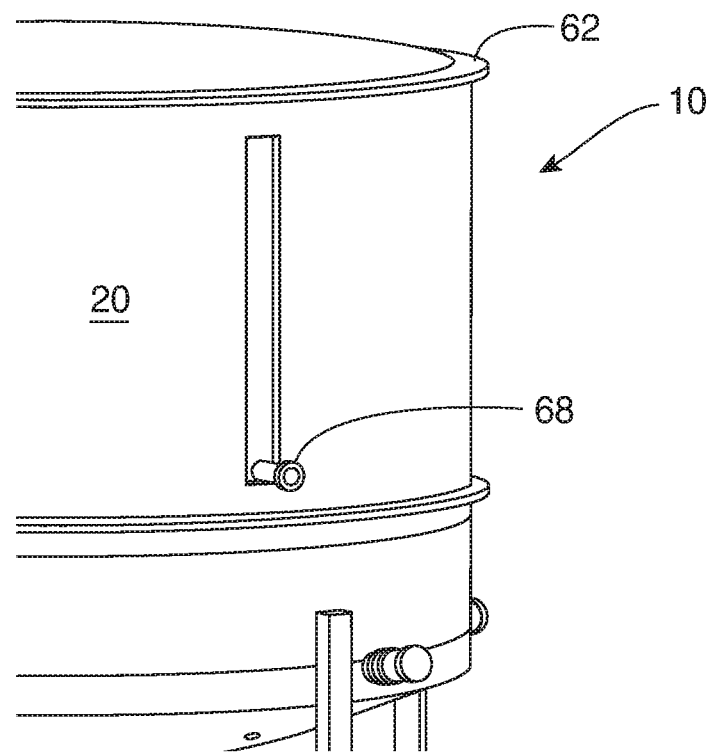
FIG. 17
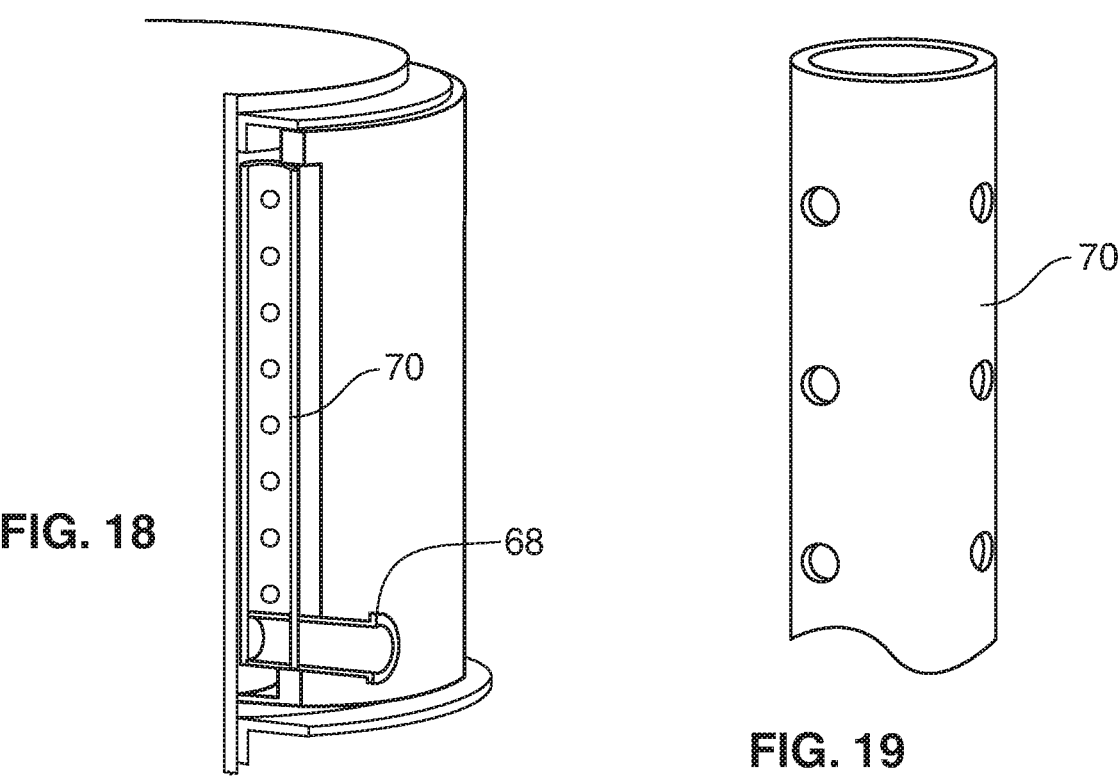
FIG. 18
FIG. 19

BIOCHAR KILN

CROSS REFERENCE TO RELATED APPLICATIONS

This application is a continuation of U.S. patent application Ser. No. 15/453,502 filed Mar. 8, 2017 for "Biochar Kiln", which claims the priority benefit of U.S. Provisional Patent Application No. 62/317,573 filed Apr. 3, 2016 for "Biochar Kiln," each hereby incorporated by reference in its entirety as though fully set forth herein.

BACKGROUND

Biochar is made from biomass (trees, agricultural waste, etc.) in an oxygen deprived, high temperature environment. Quality biochar has high purity, absorptivity and cation exchange capacity. This can provide significant benefits to several large markets including, but not limited to, agriculture, pollution remediation, odor sequestration, separation of gases, and oil and gas clean up.

BRIEF DESCRIPTION OF THE DRAWINGS

FIG. 13-23 are illustrations of example insulation of the biochar kiln shown in FIG. 1.

DETAILED DESCRIPTION

A biochar kiln is disclosed, including construction of the kiln and various subsystems such as, but not limited to, ventilation, stack, control, insulation, and ember suppression. The kiln may be implemented to produce biochar.

In an example, the kiln is configured for internal combustion and heat generation as needed, to convert biomass into biochar. During operation, the kiln may experience frequent and wide thermal cycling. For example, every 2 days, the kiln temperatures can vary between −30 and +1300 degrees Fahrenheit (e.g., stack temperature ranges from −30 F to 1850 F).

The biochar kiln is configured to support slow pyrolysis and can accommodate a number of variables. Variables include, but are not limited to, a "green" and/or dry feedstock, large and/or small pieces of the feedstock, various and multiple different species of the feedstock, and operation according to variable processing times. The biochar kiln is robust in that it may be operated under a number of variable operating conditions, while still producing a consistent and high quality biochar product.

The biochar kiln may include a local and dedicated process control system. The control system may be implemented with a ventilation subsystem, an ember suppression subsystem, and airflow management or "stack" subsystem, to help ensure high quality and high yield biochar is produced while simultaneously complying with emissions standards.

In an example, the biochar kiln has multi-zone combustion cells that are computer-controlled to maintain target temperatures while creating faster burns. Multi-zone servo dampers are computer-control to manage inlet air flows to the combustion cells to support optimum heating. The biochar kiln may also have removable stacks and a stack hole sealing mechanism. The kiln may also be configured for negative flue gas pressure to eliminate fugitive emissions.

Before continuing, it is noted that as used herein, the terms "includes" and "including" mean, but is not limited to, "includes" or "including" and "includes at least" or "including at least," The term "based on" means "based on" and "based at least in part on."

Figure 1:
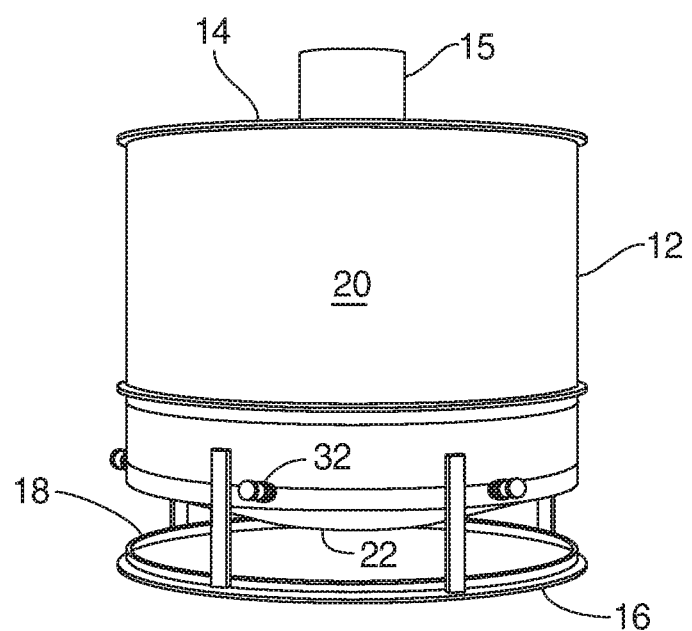
FIG. 1 is a perspective view of an example biochar kiln.

FIG. 1 is a perspective view of an example biochar kiln 10. The biochar kiln 10 may include a main body portion 12 and a lid 14. The main body portion 12 is configured to receive a feedstock (not shown) by removing the lid 14 and loading the feedstock before replacing the lid 14. In an example, the biochar kiln further includes a base portion 16. The base portion 16 may be configured such that it is raised off of the ground. This enables airflow under the main body portion 12. A ring 18 may also be implemented to lift the biochar kiln 10, e.g., using a loader tractor, forklift or other suitable machinery.

In an example, the kiln wall 20 may be made of a one-piece, rolled wall. Body welds, where needed (e.g., between the floor 222 and wall 20, and various ports), are made on curved surfaces to lower structural and thermal stress to those joints.

The floor 24 may also be a one-piece heavy gauge, high strength steel. The floor 24 may be downward elliptical-shaped (the shape being visible in FIG. 1 and FIG. 5) to withstand heavy falling wood chunks during filling. The surface of the floor 24 is curved and has only one weld joint along the perimeter where it joins with the wall 20. The floor 20 and walls 20 may anneal with use, which also serves to relieve stress.

Before continuing, it should be noted that the examples described above are provided for purposes of illustration, and are not intended to be limiting. Other devices and/or device configurations may be utilized to carry out the operations described herein.

Figure 2:
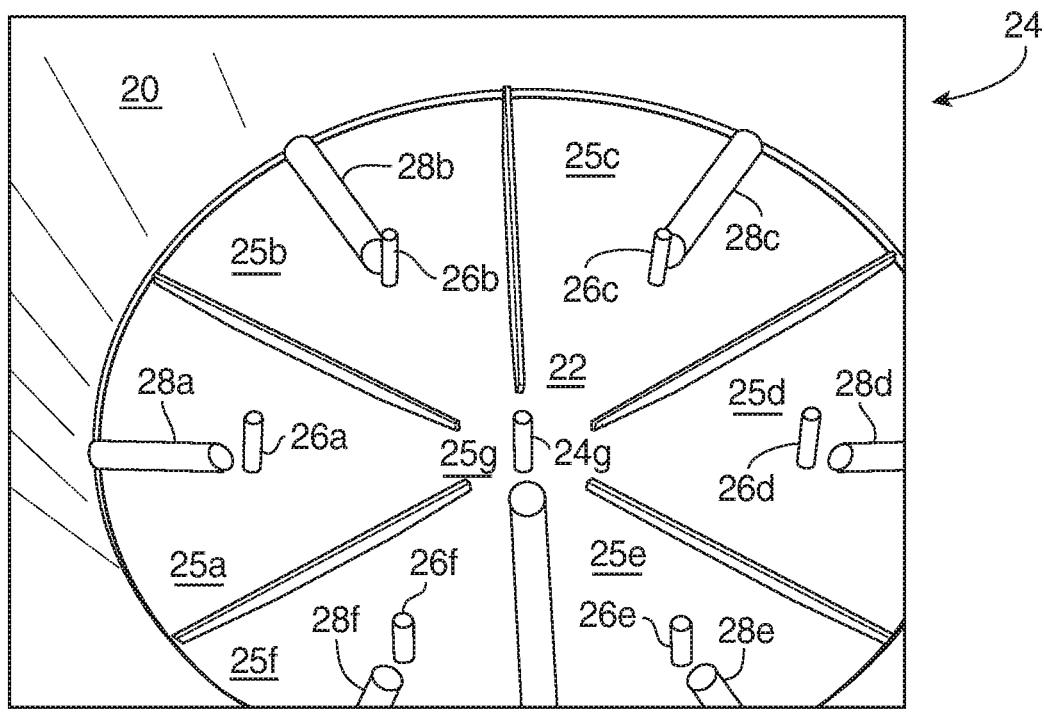
FIG. 2 is an interior view of a floor of the example biochar kiln, illustrating a ventilation subsystem.
Figure 3:
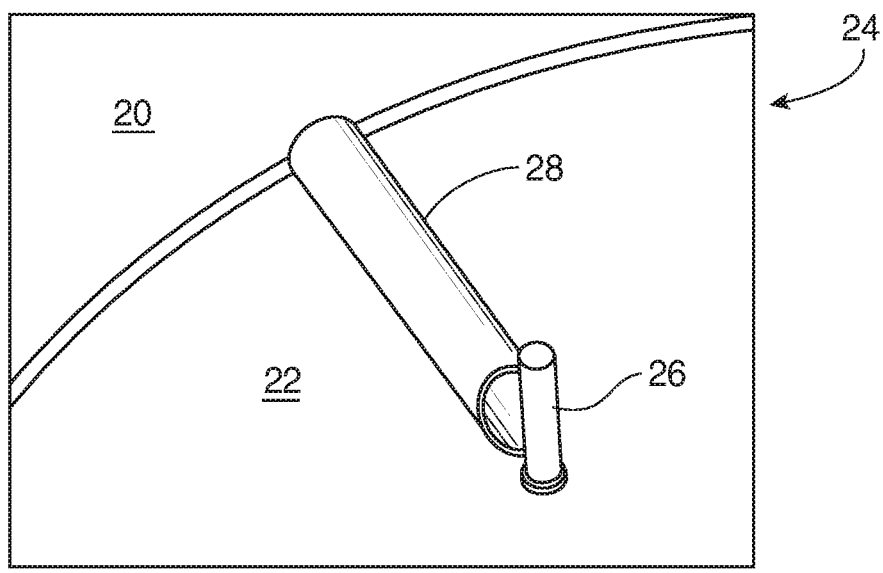
FIG. 3 is a close-up view of the ventilation subsystem shown in FIG. 2.
Figure 4:
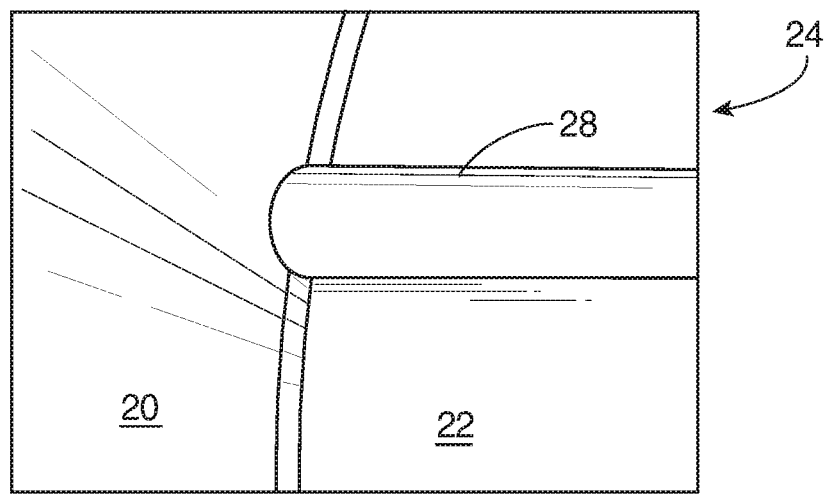
FIG. 4 is another close-up view of the ventilation subsystem shown in FIG. 2.

FIG. 2 is an interior view of a floor 20 of the example biochar kiln 10, illustrating a ventilation subsystem 24. The ventilation subsystem 24 may include a plurality of semi-independent combustion cells 25a-g. In the example shown, there is a combustion cell 25g in the center, and six combustion cells 25a-f between the center cell 25g and the kiln wall 20. An outside vent pipe 28a-f leads to the center of each cell to provide combustion air. FIG. 3 is a close-up view of the ventilation subsystem 24 shown in FIG. 2. FIG. 4 is another close-up view of the ventilation subsystem 24 shown in FIG. 2.

In an example, upward facing thermowell tubes 26a-g may be built into the floor 20 for each combustion cell 25a-f. The thermowell tubes 26a-f may be positioned adjacent vent pipes or air inlets 28a-f. Another thermowell tube 26g may be positioned substantially in the center of the floor 20, e.g., for combustion cell 25g. The thermowell tubes 26a-g may be configured with monitors to enable interior biochar temperature sensing while the biochar is cooking.

Figure 5:
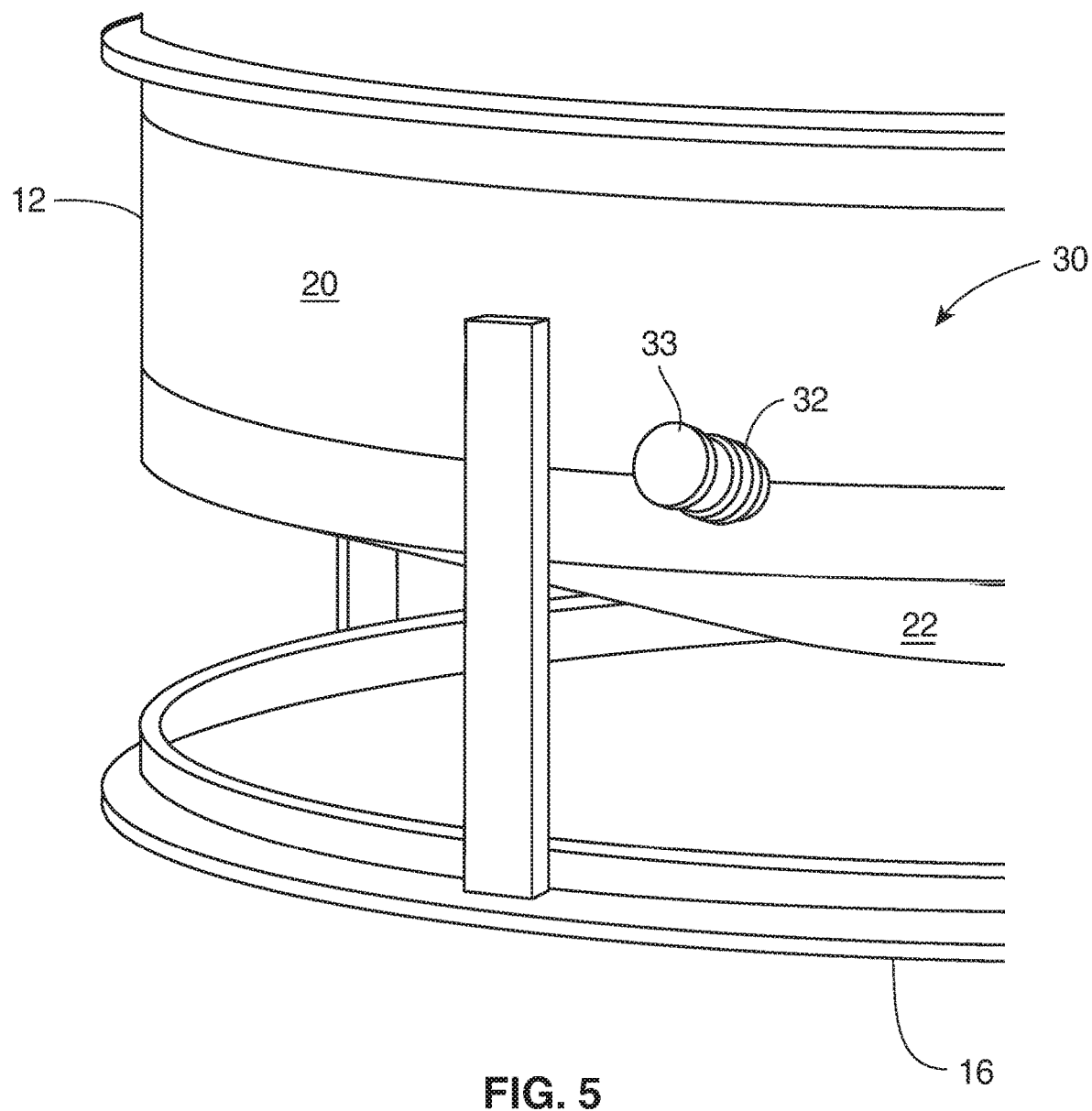
FIGS. 5-8 are close-up views of the exterior of the example biochar kiln, illustrating the ventilation subsystem.

FIGS. 5-8 are close-up views of the exterior of the example biochar kiln, illustrating a ventilation subsystem 30. The ventilation subsystem 30 includes ports 32 around the perimeter of the body 12 of the biochar kiln 10. Each of the ports 32 is connected to the internal air inlets 28a-f. These ports may be closed (e.g., as shown in FIG. 5) and opened manually, or via computer control.

Figure 6:
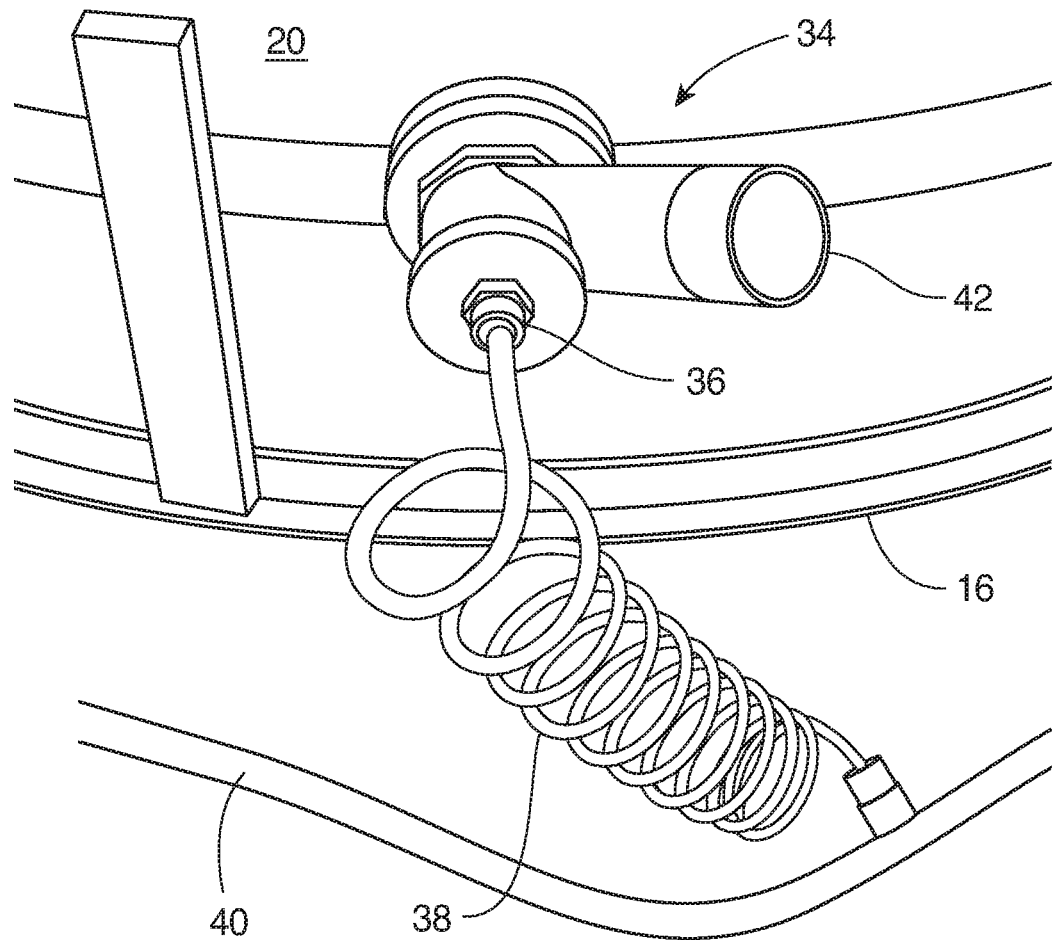
Figure 7:
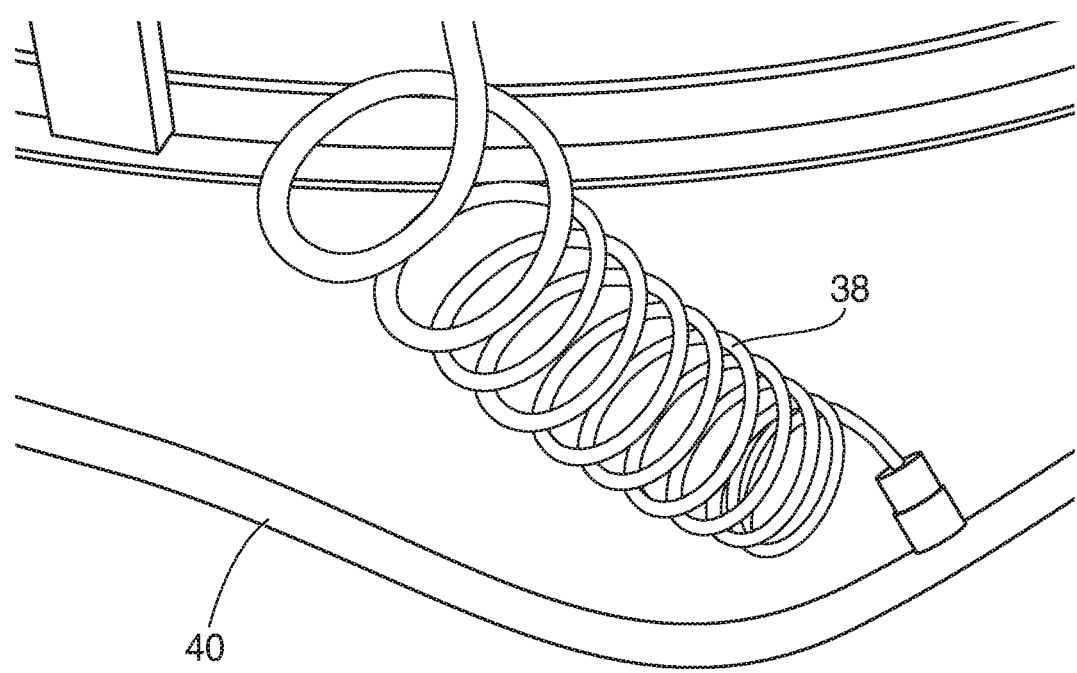
Figure 8:
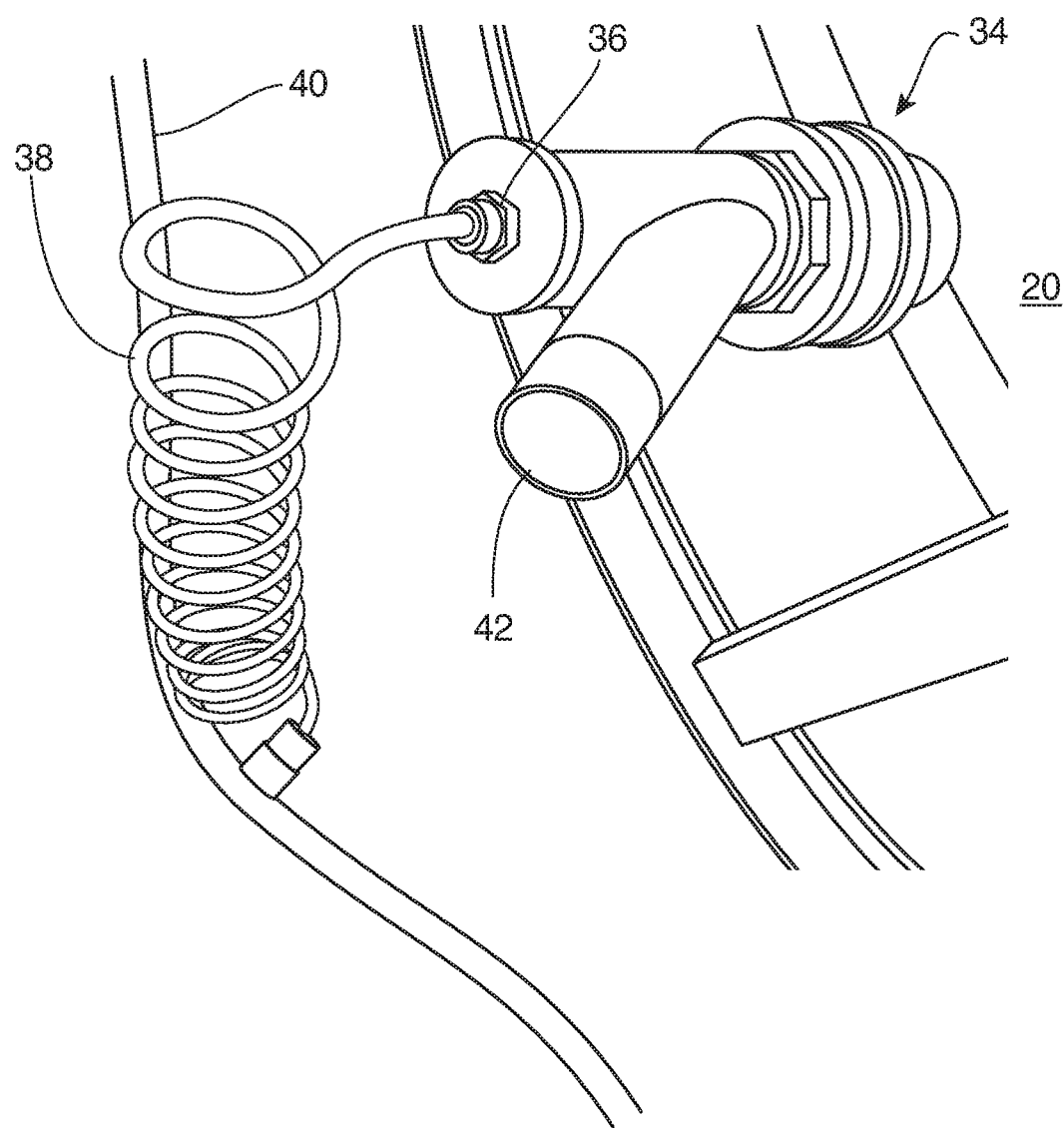

In FIGS. 6-8, an automatic control is shown including dampers 34 with air inlet 36 which can be connected to a gas line 38 to a main line 40 to supply ignition gas into the chamber formed in the body 12 of the biochar kiln 10.

The dampers 34 are each attached to the outside portion of the corresponding vent pipes 28a-f to provide computer-controlled airflow. Each damper has a servo-controlled butterfly valve 42 to regulate airflow. Damper airflow results from negative pressure in the kiln (the vacuum sucks air in), or can be blown in by an external blower or both.

In an example, the ventilation subsystem 30 may be implemented with the control system described herein to provide a controlled airflow, thus enabling a carefully controlled burn and emissions control. In an example, each servo is computer-controlled and provides physical position feedback to the computer to confirm the valve's position. The feedback enables the computer control to determine whether a valve is working, blocked or failed. In an example, servo accuracy is about +/−0.5 degrees to permit precise control.

In an example, the kiln is equipped with one or more pressure transducer(s) to insure negative kiln pressure. Air vent pipes for each combustion cell may also pass through the floor flange. After a burn, the vent pipes can be sealed with cam-lock caps to help cut off oxygen, stop combustion and cool the biochar.

At the end of a burn, dampers 34 are removed from the vent pipe openings 32 and replaced with airtight, gasket cam-lock caps 33 (shown in FIG. 4) over the vent pipe openings 32. The dampers 34 are then temporarily secured to the kiln wall during kiln transit or moved to another kiln for further use.

Damper wiring may be routed to a kiln-mounted control board to eliminate the need to unplug and plug damper wiring when the kiln travels to and from the workstations.

In addition to airflow control, the damper assembly 34 provides a computer-controlled gas-start system to ignite the wood during a fresh burn. Gas flow is turned by the computer via a gas solenoid.

During operation gas is piped into the assembly where it flows through a venturi pulling in air to the air/gas mix tube before being exposed to a preheated glow plug igniter. The ignited gas then travels by a thermocouple probe to verify its ignition and down the vent pipe to start the wood fire at its combustion cell.

Figure 9:
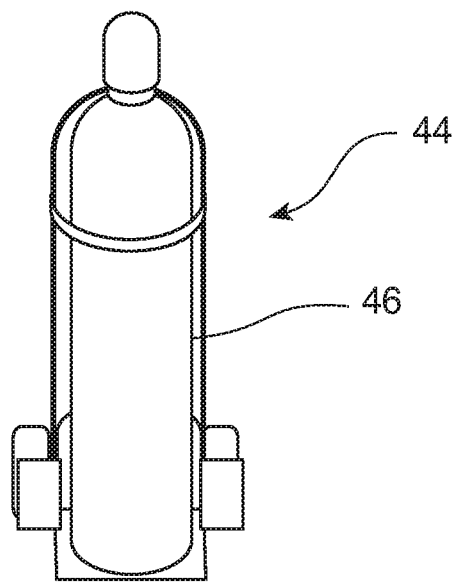
FIGS. 9-10 are perspective views of example components of an ember suppression subsystem of the biochar kiln.
Figure 10:
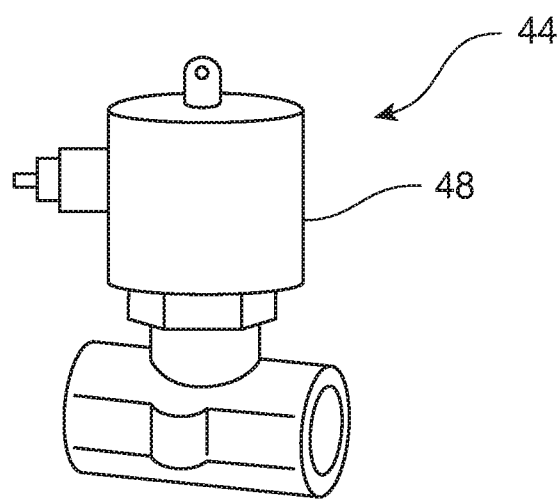

FIGS. 9-10 are perspective views of example components 46 and 48 of an ember suppression subsystem 44 of the biochar kiln 10. An ember suppression subsystem 44 is provided in the event ember suppression is needed after a burn. In an example, a gas 46 (e.g., nitrogen, carbon dioxide, and/or other inert gases) can be injected into the kiln 10 (e.g., at one or more ports 32, the exhaust stack 51, or other suitable location) to purge and/or dilute residual oxygen in the chamber of kiln 10. In an example, carbon dioxide is utilized because it is about two times heavier than air, which enables the biochar to flood a kiln from the bottom up so it can be processed the next morning. Without oxygen, there is no combustion and the embers are put out (stop burning) to allow the biochar to cool down.

The introduction of suppression gases can be managed by a regulator 48 (FIG. 10) at port 32 or other suitable location, to maintain a low, positive kiln pressure. This helps keep fresh air from entering the kiln. After the heat is reduced to a safe level, the control system can turn off the gas supply. In an example, a safe temperature is about 300 F to 400 F (e.g., it is noted that the auto ignition temperature of wood is about 570 F). By using suppression gases, instead of a water quench, the biochar can be processed in its dry state.

The ember suppression subsystem may also be implemented at least in part in the lid. In an example, the lid has a gasket attached to it at the perimeter. The gasket gets squeezed between lid flange located above the gasket and the flange on the kiln rim below. The gasket reduces or prevents air leaks during ember suppression. During the burn, the gasket also helps retain fugitive smoke in the kiln (e.g., in case of a short term negative pressure drop).

Figure 11:
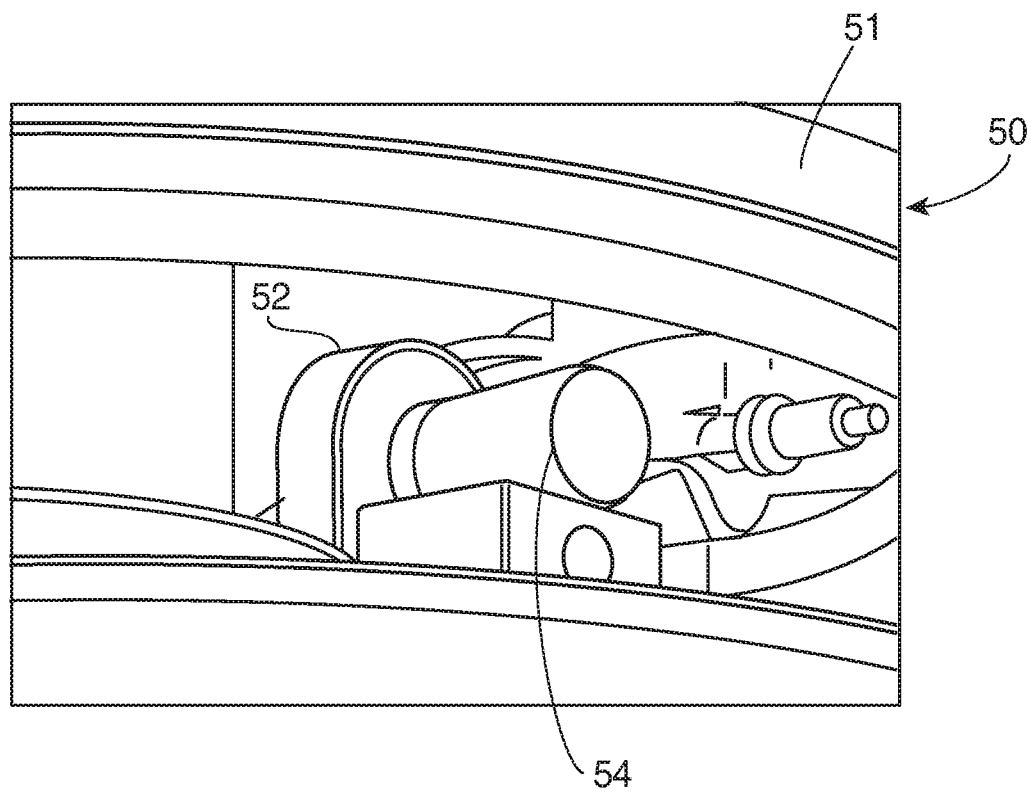
FIG. 11 is a perspective view of an example stack subsystem of the biochar kiln.

FIG. 11 is a perspective view of an example stack subsystem 50 of the biochar kiln 10. In FIG. 11, a portion of the stack 51 (shown in FIG. 1) is illustrated in detail. In an example, a stack 51 sits on top of the lid 14 of the biochar kiln 10.

In an example, a reflector/flow director is attached to the underside of the lid. This reflects radiant heat back into the kiln and biochar while also directing the flue gas to the out perimeter of the kiln, which improves heat distribution in the kiln.

The stack may be anchored by gravity and/or other attachment(s). In an example, the base of the stack is wide enough to provide stability (e.g., up to about 90 mph wind loads). At the bottom of the stack 51, a smoke chamber 52 funnels kiln gases into the stack 50. A stack blower 54 moves the smoke first horizontally and then curves straight up and through the top of the stack 51.

During example operation, the stack blower 54 moves combustion air through the duct 52 where the smoke then enters a venturi mix tube. Air from the blower 54 entrains nearby flue gas to pull it up into the mix tube of the stack 51. At the top end of the mix tube (see FIG. 1), the air and flue gas combine on their way to a secondary or exhaust burner (not shown).

As the air and flue gas pass through the burner (natural gas or propane), it ignites volatile gases (if any), which lowers emission pollution, burns particulates, heats the vapors and spirals the smoke upward to heat refractory material above the burner. The spiral effect is caused by vanes placed just after the burner. The spiraling hot vapors spend more time heating the refractory than a straight upward flow.

In an example, the target refractory temperature is about 1650 F, and is managed by adjusting the burner fuel flow rate and/or the blower flow rate. At 1650 F, CO combines with radical Oxygen to make CO2, which is an acceptable emission gas (whereas CO is highly regulated). In addition, at 1650 F, thermal NOX is also kept low.

An added stack extension (not shown) may be provided to help increase flow rate due to stronger convection flow. Less entrainment air is required, for less cooling, less use of burner gas. This may reduce or eliminate the need for refractory material, thus reducing cost.

The blower 54 provides a negative kiln pressure (e.g., by reducing or altogether eliminating fugitive smoke, and providing suction to pull air in from the dampers). The blower 54 also provides oxygen for emission conversion and burner combustion, and helps control stack temperatures by adding cooling air.

Figure 12:
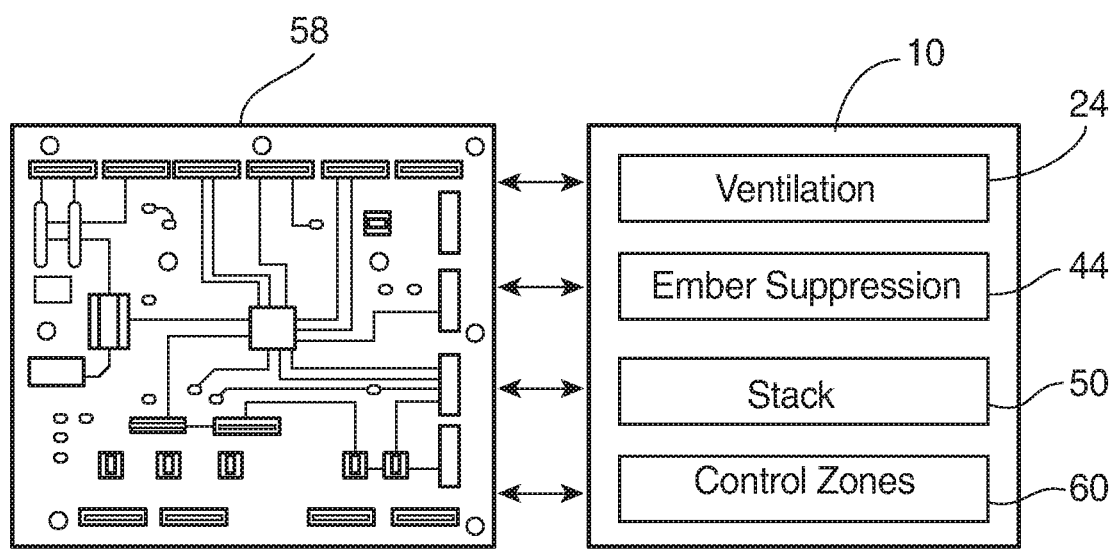
FIG. 12 is a high-level block diagram of an example control subsystem of the biochar kiln.
Figure 13:
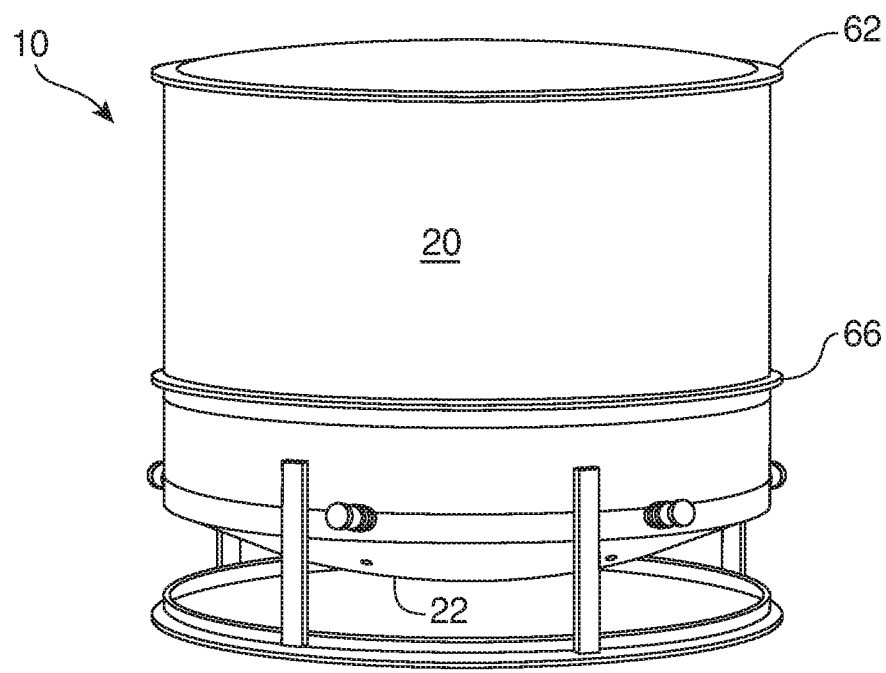

FIG. 12 is a high-level block diagram of an example control subsystem 56 of the biochar kiln 10. The control subsystem 56 may include one or more controller 58. In an example, the controller 58 may be implemented as a PLC (programmable logic array). The controller 58 may be mounted in any suitable location (e.g., on a pole near the kiln). The PLC has enough computing power to run multiple kilns. In an example, the cable between the kiln and the PLC has 4 conductors (2 for DC power and 2 for data) which makes plugging and unplugging easy. In another example, a controller 58 may be provided for each kiln where and can travel with the kiln.

The controller 58 may receive input and/or feedback from the kiln (e.g., the ventilation subsystem 24, the ember suppression subsystem 44, and/or the stack subsystem 50). The controller 58 may also provide output or control of the various subsystems.

In addition, the kiln and stack may also be considered to include a plurality of control zones 60. The control zones 60 are independent, horizontal and/or vertical zones within the kiln body 12 and stack 51. The zones each have one or more process control variable (e.g., temperature, oxygen level). The zones 60 may be physical component(s) and/or area(s) (both physical and virtual) of the kiln body 12 and/or stack 14 itself, and/or a process component, such as the feedstock, product (including intermediary product), air, gas(es), and smoke within the kiln body 12 and/or stack 14.

Examples zones 60 include, but are not limited to, floor combustion cells, the kiln feedstock itself, the produced biochar itself, the kiln lid 14, the stack smoke chamber, stack mix venturi, the stack burner, Flue gas spiral vanes, Stack refractory, Stack extension. The zones 60 may be equipped with one or more sensor and/or dampers. These zones 60 may be managed by the controller 58.

In an example, each kiln 10 has its own computer control board (e.g., for easy transit and improved individual kiln reliability). The control board may be wirelessly linked to a site controller to accept site-wide remote commands (e.g., fire start), to provide archive data and to send status alarms.

To integrate multiple zones across multiple kilns 10, and/or multiple zones within a single kiln 10, the control subsystem 56 can apply one or more group state machines on top of individual zone state machines to insure even burns across individual zones. For example, group state machines may include a program to ask individual zones to stop at intermediate temperatures to permit slower zones to catch up. When all zones arrive at the temperature, the group is then released to continue the process.

The control board may be accessed via tablet, smart phone, and laptop devices, e.g., which provide the user interface and control. The control board may also control work lights and strobe alarms at the site and/or individual kiln(s).

In an example, the controller 58 implements state machine software and device controllers to independently manage each of the various subsystems (e.g., 24, 44, and 50) and zones 60 (e.g., a floor combustion cell). To integrate zones 60, the controller 58 can be implemented as one or more group state machines on top of individual state machines to ensure optimal group performance (e.g., to ensure consistent or even burns across all cells).

The controller 58 may enable non-programmers to develop advanced control logic and algorithms without making changes to its lower level program code. Unique control instructions (e.g., "recipes") can be generated for unique customer needs, feedstock type, emissions requirements, biochar attributes, etc.

In an example, the control subsystem 56 provides higher yields, higher biochar quality, greater consistency, optimized flow rates, vapor pressure control, end of cycle detection, lower emissions and shorter burn cycles. By way of illustration, each floor combustion cell may be provided with an optimal amount of combustion air for maximum temperature rise while working to reach a preset temperature goal. The burn control can use Boolean logic and/or PID (proportional, integral and derivative) control or other techniques for fastest temperature attainment.

FIG. 13-23 are illustrations of example insulation of the biochar kiln 10 shown in FIG. 1. On cold, windy days, over 80% of the kiln's heat can be lost through the steel shell (e.g., lid 14, walls 20, and floor 22) of the biochar kiln 10. On a windless, warm day, heat loss can be under 30%. If the kiln is insulated with a ceramic blanket (or other types), heat loss can be reduced by as much as 95%. When insulation is used, internal temperatures climb more quickly for shorter burn times, yield improvement (less wood burned), reduced emissions (less wood burned), improved consistency (soak heats are more evenly distributed), and improved quality. Exposing the ceramic blanket to rain and snow quickly transforms it into a poor insulator. To protect the blanket, it may be encapsulated in a high temperature weatherproof skin.

Figure 14:
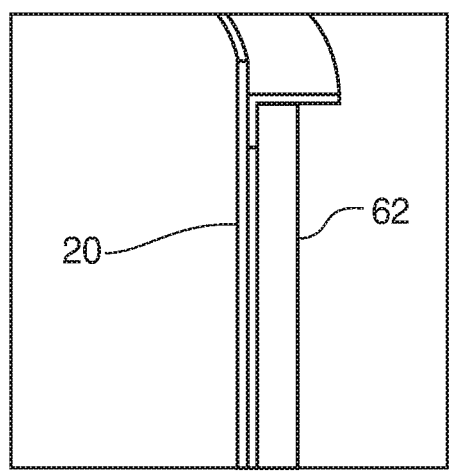
Figure 15:
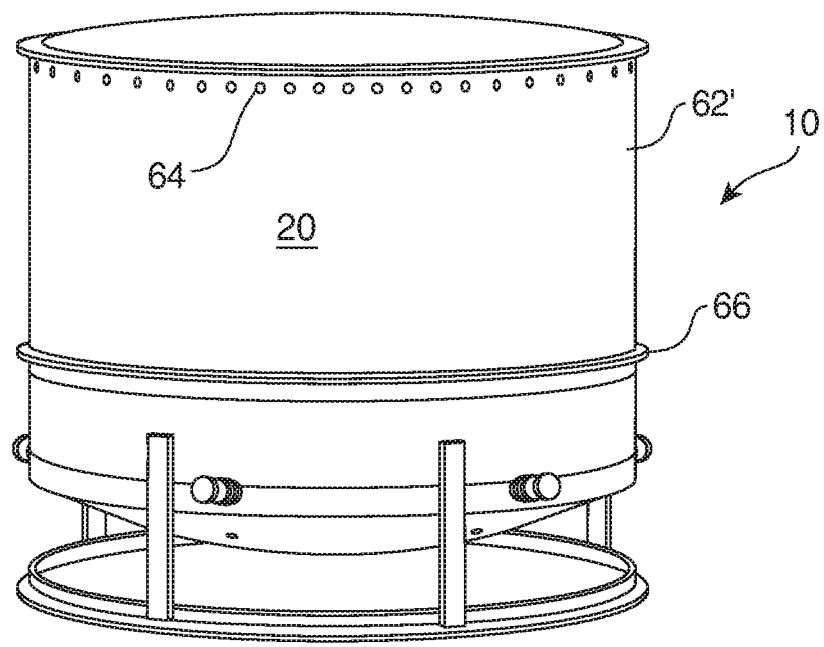
Figure 16:
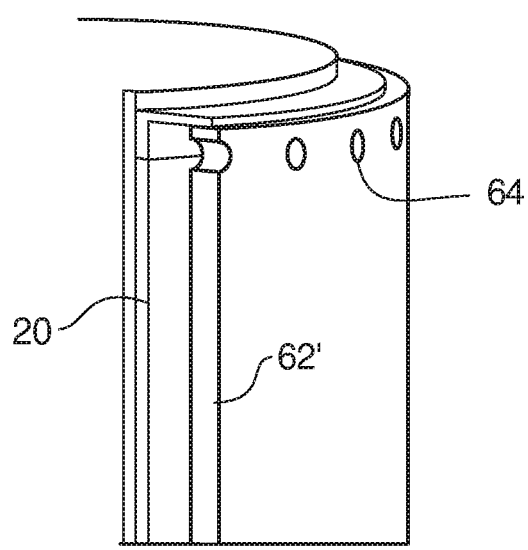

In an example, a cylindrical insulator 62 (FIG. 13) is provided that follows the shape of the kiln wall 20. FIG. 14 is a close up of the upper side edge of the wall 20 showing the cylindrical insulator 62 in detail.

In another example, the insulating cylinder 62' may stand away from the kiln wall 20 to allow forced air flow through a gap between the kiln wall 20 and the insulating cylinder 62, and optionally through openings or vents 64 (e.g., after a burn). In an example, (not shown), a ring or band with similar sized and spaced openings can be fit snugly to the insulation. During processing, the band can be rotated so that the vents 62 are at least partially or fully covered. To aid in cooling, the band can be rotated so that openings in the ring line up with the vents 64. By natural convection, the air inside the space is heated by the Kiln wall. It then rises out the vent openings, drawing cool air into the air space from the bottom.

Ambient air (or chilled air) blowers may be provided to force air to pass between the kiln wall and insulation for cooling before it exits on the far side. Sensing the existing air temperature and internal thermowell temperatures can indicate when the kiln is safe to open.

In an example, the insulation is about 1.5 inches thick, although other sizes may be provided. The insulator 62 and 62' can detach from the kiln to permit replacement and maintenance as needed.

There may be provided a clearance between a gripper ring 66 and the bottom of the insulation so that gripping the gripper ring 66 (e.g., with a forklift or other machinery to raise/lower the kiln 10) does not pinch or otherwise harm the insulation. This distance may depend on the dimensions of the gripper and the expected accuracy of the loader driver while picking up the Kiln.

The insulation 62 and 62' holds significantly more heat inside the Kiln during processing, and is expected to reduce the amount of wood burned (increasing efficiency) with increased yield of char.

If using natural convection doesn't allow cooling of the Kiln in a short enough time, forced convection may be provided. One way to accomplish forced convection is by mounting a pipe 68 vertically to the kiln 10, as shown in FIG. 17. The pipe 68 can direct air into the space between the kiln wall 20 and the insulation. It may be possible to leave this pipe 68 uncapped during processing, since little air will escape. If desired, the pipe(s) 68 can be capped.

The pipe(s) 68 distribute forced air both ways (e.g., left and right) into the air space on one side of the kiln 10. If it is desired to "collect" the air on the opposite side of the kiln 10, another similar pipe can be installed. If faster cooling is desired, 4 pipes can be used, 2 for inlet and 2 for "exhaust", though the complexity increases significantly. These are only exemplary configurations. Other configurations are also contemplated.

As shown in FIGS. 18-19, plenum walls 70 may be provided inside the air space to keep the cooling coverage more even than if the forced air could flow vertically inside the air space. These plenum walls 70 may be welded to the Kiln wall in a circular direction and could be full or partial walls.

Figure 20:
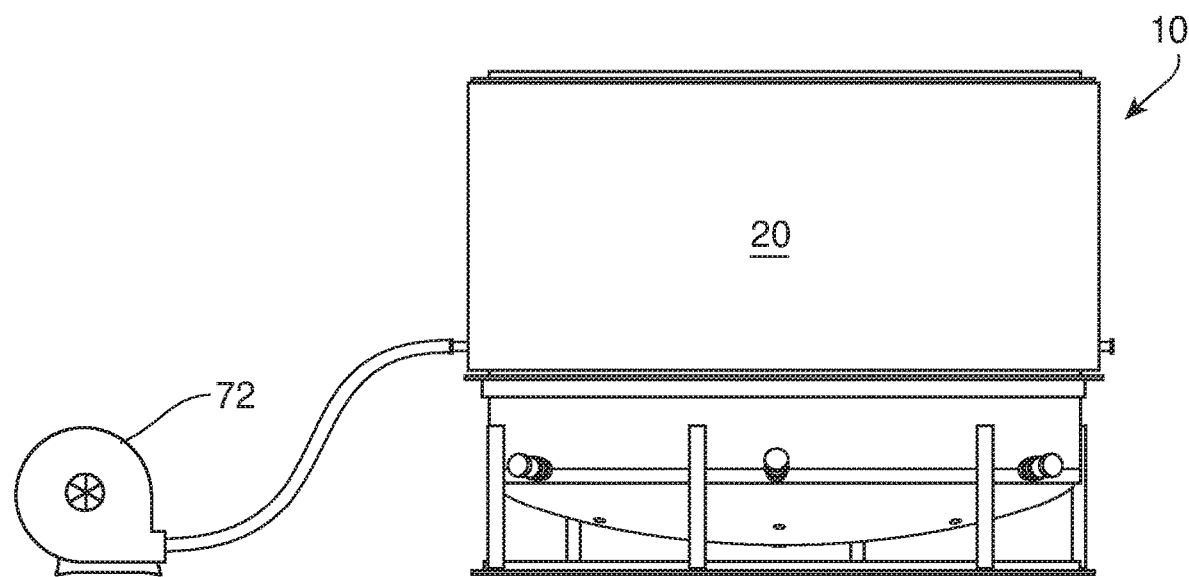

FIG. 20 shows a blower 72 attached to the inlet of the forced air system. Forced convection possibly will require an additional blower for each kiln 10 in the cool-down cycle.

Figure 21:
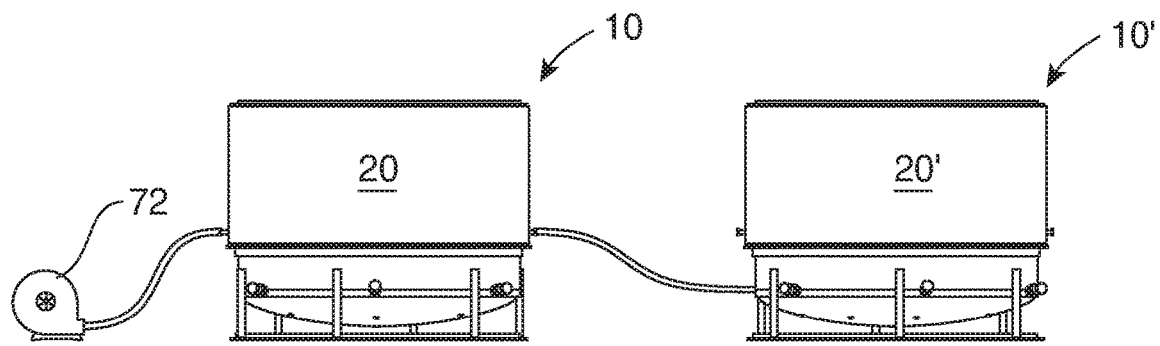

FIG. 21 shows how to use the "waste" heat from the kilns 10. If the heated air from cooling a processed kiln 10 is piped into the inlet air pipes of a waiting kiln 10', some amount of drying of the wood might be accomplished while waiting to process the loaded kiln. This may reduce the time needed to evaporate all the moisture in the wood during processing.

The heated air may be forced into 2 or 3 inlets, as illustrated by FIG. 21. Or a manifold of sorts could be attached to the waiting kiln, where hot air could enter all air inlets and would exit through the lid (some venting mechanism might be provided on the lid if general air leaks are not enough).

Figure 22:
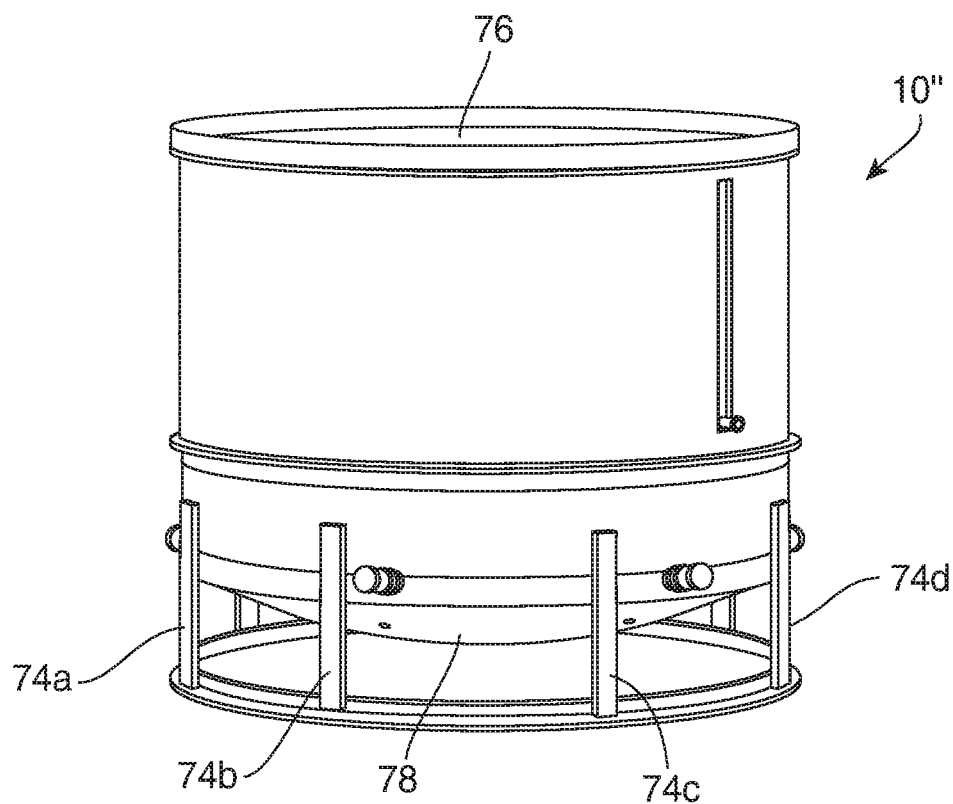
Figure 23:
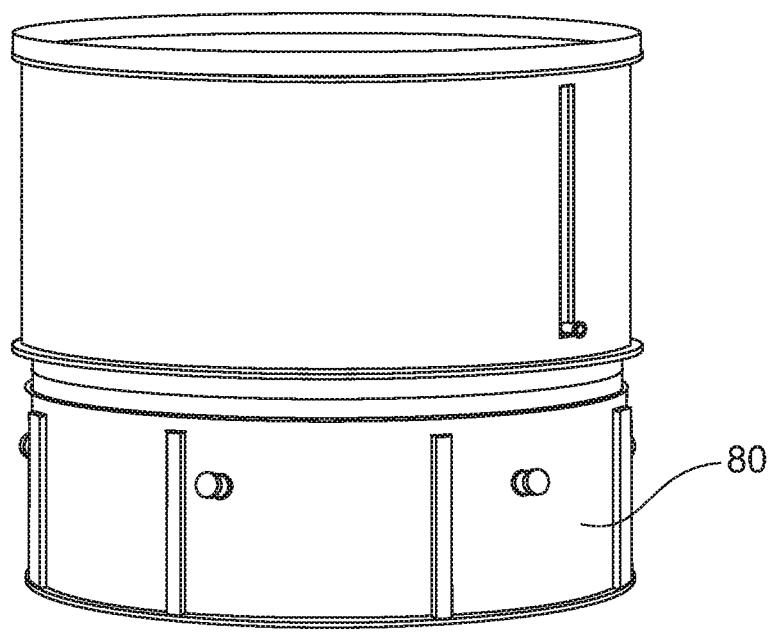

FIGS. 22-23 show a kiln 10" having six 2×2 inch legs (legs 74a-d are visible in FIG. 22) and a rolled angle bottom with top insulation 76 and bottom insulation 78. Bottom insulation 78 may not be provided if the bottom area is enclosed with insulation or insulation sections 78.

In this example, there may be no air blown into/out of the bottom for cooling to reduce the need for plumbing through the insulation 80. As the heat rises, and when the walls and inside air were cooled, the bottom may lose heat to the Kiln air. If forced air cooling is desired for the bottom, a small diameter pipe may be attached to the blower, and cool air can be blown into the bottom chamber which exits from vents in the bottom insulation sections.

A similar air space/insulation configuration may be used for the lid. The stack blower may be used to provide the forced air for cooling. It may implement a switched damper to divert the air from the stack to the lid and/or kiln. It is noted that the kiln and lid may be hot if plumbing needs to be connected. In another example, a blower is attached to the lid that is used for cooling.

In an example, the kiln insulation is provided in sections to make it easier to install. Overlapped sheet metal joints may hold sections together and help prevent air loss during cooling.

In an example, the kiln wall insulation is enclosed in a "box" (e.g., of 1/16" or 16-gauge (or thinner) sheet metal). For the kiln walls and bottom sections, these may be rolled to fit, with bent or welded ends for fastening the "front" and "back" sides together. An attachment mechanism/bracket may be welded to the kiln. In other examples, these insulation sections may be fastened to the brackets.

If the insulation section dimensions are about half or whole multiples of about 14.5 inches, fiberglass rolls may fill the inside of the insulation sections (e.g., 16 inch stud spacing less 1.5 inch stud is about 14.5 inches). It is noted that careful dimensioning may lead to more efficient use of the insulation.

It is noted that the examples shown and described are provided for purposes of illustration and are not intended to be limiting. Still other examples are also contemplated.

The invention claimed is:

1. A biochar kiln, comprising:
    a kiln body having a sidewall, a floor attached to the sidewall, and a removable lid;
    a plurality of combustion cells;
    a plurality of outside vent pipes each connecting to a center of a respective one of the combustion cells to provide combustion air;
    a plurality of thermowell tubes built into the floor of the kiln body for each of the combustion cells, wherein at least one of the thermowell tubes is positioned substantially in the center of the floor.

2. The biochar kiln of claim 1, wherein the plurality of combustion cells includes a center combustion cell in a center of the kiln body.

3. The biochar kiln of claim 2, wherein the plurality of combustion cells includes perimeter combustion cells between the center combustion cell and the sidewall of the kiln body.

4. The biochar kiln of claim 3, wherein the outside vent pipe is in a center of each of the perimeter combustion cells.

5. The biochar kiln of claim 1, wherein at least some of the thermowell tubes are positioned adjacent the outside vent pipe.

6. The biochar kiln of claim 1, wherein at least one of the thermowell tubes is monitored by a temperature sensor to enable interior biochar temperature sensing while biochar is cooking in the kiln body.

7. The biochar kiln of claim 1, further comprising a control subsystem configured to manage a plurality of zones within the kiln body, at least one of the zones defined at least in part by at least one of the plurality of combustion cells.

8. The biochar kiln of claim 7, wherein the zones include independent horizontal and vertical zones.

9. The biochar kiln of claim 7, wherein the zones are managed for variable kiln wood, kiln biochar, stack smoke, stack mix, stack burner temperature, and flue gas.

10. The biochar kiln of claim 7, wherein the zones are monitored by one or more sensor and/or dampers.

11. The biochar kiln of claim 1, further comprising multiple zones defined by the plurality of combustion cells, the zones computer-controlled to maintain target temperatures.

12. The biochar kiln of claim 11, further comprising multi-zone servo dampers that are computer-controlled to manage inlet air flows to the plurality of combustion cells to support heating.

13. The biochar kiln of claim 12, wherein at least some of the plurality of combustion cells are provided with an amount of combustion air for maximum temperature rise to reach a preset temperature goal.

14. A biochar kiln, comprising:
    a kiln body having a sidewall, a floor attached to the sidewall, and a removable lid;
    a plurality of semi-independent combustion cells including at least a center combustion cell in a center of the kiln body and perimeter combustion cells between the center combustion cell and the sidewall of the kiln body;
    an outside vent pipe in a center of each of the perimeter combustion cells, the outside vent pipe linking to a center of the semi-independent combustion cells to provide combustion air; and
    a plurality of thermowell tubes built into the floor of the kiln body for each of the combustion cells wherein at least one of the thermowell tubes is monitored by a temperature sensor to enable interior biochar temperature sensing while biochar is cooking in the kiln body.

15. The biochar kiln of claim 14, further comprising multiple zones defined by the plurality of semi-independent combustion cells, the zones computer-controlled to maintain target temperatures.

16. A biochar kiln, comprising:
a kiln body having a sidewall, a floor attached to the sidewall, and a removable lid;
a plurality of semi-independent combustion cells including at least a center combustion cell in a center of the kiln body and perimeter combustion cells between the center combustion cell and the sidewall of the kiln body;
an outside vent pipe in a center of each of the perimeter combustion cells, the outside vent pipe linking to a center of the semi-independent combustion cells to provide combustion air;
at least one computer controlled temperature zone defined at least in part by the plurality of semi-independent combustion cells; and
a control subsystem configured to manage a plurality of zones within the kiln body, at least one of the zones defined at least in part by at least one of the plurality of combustion cells, wherein the zones include independent horizontal and vertical zones.

17. The biochar kiln of claim 16, further comprising a plurality of thermowell tubes built into the floor of the kiln body for each of the semi-independent combustion cells.

\* \* \* \* \*